US005837344A

United States Patent [19]
Braun

[11] Patent Number: 5,837,344
[45] Date of Patent: Nov. 17, 1998

[54] SPIRAL COIL BINDING SYSTEM

[75] Inventor: Carl G. Braun, Woodbury, Conn.

[73] Assignee: Gunther Technologies, Inc., Mystic, Conn.

[21] Appl. No.: 701,645

[22] Filed: Aug. 22, 1996

[51] Int. Cl.[6] .......... B32B 3/10
[52] U.S. Cl. .......... 428/139; 412/39; 428/131; 428/132; 428/136; 428/192; 428/222
[58] Field of Search .......... 428/131, 132, 428/136, 138, 222, 139, 192; 412/39

[56] References Cited

U.S. PATENT DOCUMENTS

| | | |
|---|---|---|
| 1,356,588 | 10/1920 | Bacher . |
| 2,845,758 | 8/1958 | Lowthian . |
| 3,270,877 | 9/1966 | Hecker . |
| 5,059,078 | 10/1991 | Schmid . |
| 5,197,842 | 3/1993 | Bross . |

FOREIGN PATENT DOCUMENTS

| | | |
|---|---|---|
| 9404459 U | 3/1994 | Germany . |
| 460707 | 8/1968 | Switzerland . |
| WO9525047 | 9/1995 | WIPO . |

*Primary Examiner*—James J. Bell

[57] ABSTRACT

A system for holding a spiral coil binding assembly formed from a coiled filament and having a plurality of coils with a predetermined pitch. The system comprises a carrier sheet, a plurality of rows of cut-outs on the carrier sheet. The cut-outs in the carrier sheet, or at least some of them, are holding openings which will receive the filament of a spiral coil binding assembly in order to hold the spiral coil binding assembly in place on the carrier sheet. The system also includes mechanism for removing each of the spiral coil binding assemblies from the carrier sheet and directing them to a binding machine.

29 Claims, 5 Drawing Sheets

SPIRAL COIL BINDING SYSTEM

BACKGROUND

The present invention relates to spiral coil binding systems and more particularly to plastic spiral coil binding holders and to an improved system for storing and feeding plastic spiral coil bindings to a binding machine.

Spiral coil bindings are used to bind books, calendars, etc. In metal spiral coil binding processes the metal wire coil is formed at the time of binding so that it is possible to achieve great speeds. However, presently there are no devices that permit the storing and automatic feeding of plastic coil spiral bindings to a binding machine. The major problem is that, unlike metal spiral coils, the manufacture of plastic spiral coil bindings has not been possible in continuous form. Therefore, it is necessary to manufacture a plastic monofilament and then produce specific lengths of plastic spiral coils on a coil making machine. The individual plastic spiral coils are then deposited in bulk into a packing container. When the plastic spiral coils are to be used for binding, each individual plastic spiral coil must be taken singly from the container and hand fed into a binding machine. It will be readily seen that this substantially reduces the speed that can be achieved in the binding process and increases its cost.

There exists German Gebrauchsmuster No. G 94-04-459.7 issued on Mar. 16, 1994. This patent is directed to a carrier for holding metal binding combs which are used to bind books, etc. In that German patent, a carrier sheet of paper or the like has a plurality of holding tabs which are cut into the sheet and the metal binding combs are pushed through and under the holding tabs and is held in place on the sheet by the holding tabs. One drawback of the structure shown in that patent is that should the holding tabs rip or be otherwise damaged the binding comb cannot be held in place on the carrier sheet. In addition, if the binder comb is not pushed through the carrier sheet a sufficient distance the holding tabs will not be able to hold the binder comb on the carrier sheet.

OBJECT AND BRIEF DESCRIPTION

The present invention avoids the drawbacks of previous plastic spiral coil binding systems and has for one of its objects the provision of an improved plastic spiral coil system which allows for the continuous feeding of plastic spiral coils into a binding machine.

Another object of the present invention is the provision of an improved plastic spiral coil system which allows for an increase in binding speed.

Another object of the present invention is the provision of an improved plastic spiral coil system which allows for the automatic feeding of plastic spiral coils to a binding machine.

Another object of the present invention is the provision of an improved plastic spiral coil system for binding books and the like which permits a greater number of books to be bound in a particular frame than presently attainable.

Another object of the present invention is the provision of an improved plastic spiral coil system for feeding plastic spiral coils to a binding machine.

Another object of the present invention is the provision of an improved plastic spiral coil system for storing plastic spiral coils until they are to be used.

Another object of the present invention is the provision of an improved plastic spiral coil system holding means for holding plastic spiral coils which may be shipped, stored or displayed without disturbing the individual plastic spiral coils which are held thereon.

Another object of the present invention is the provision of an improved plastic spiral coil system which is simple and inexpensive to operate and maintain.

Other and further objects will be obvious upon an understanding of the illustrative embodiment about to be described, or will be indicated in the appended claims and various advantages not referred to herein will occur to one skilled in the art upon employment of the invention in practice.

The present invention accomplishes these objects by providing for die cutting or otherwise forming a pattern of cut-outs or similar openings horizontally across the face of a paper carrier sheet in a pattern which conforms to the pitch and spacing of the particular plastic spiral coil assembly to be held by the carrier sheet. The plastic spiral coil assembly is then pressed into the cut-outs and held in place to form a group of mounted plastic spiral coils for automatic feeding to a coil inserting (binding) machine. In one embodiment of the present invention the cut-outs comprise a plurality of holes aligned with each other along an axis having substantially the same pitch as the pitch of the coils of the plastic spiral coil assembly to be mounted on the carrier sheet. The outer holes preferably have a diameter the same as or slightly greater than the diameter of the filament of the coils and receive the coils therein and hold the plastic spiral coil assembly in place. In another embodiment of the invention, some of the cutouts in the paper carrier sheet are cut in such a manner that spaced enlarged holding openings are formed therein into which the coil of a plastic spiral coil assembly can enter and be held in place. The spaced enlarged openings preferably may have a diameter the same as or slightly greater than the diameter of the filament of the coil to be held in the carrier sheet. The paper carrier sheet may be disposable or may be reused if desired. The paper carrier sheet is preferably a continuous strip which may be wound on a reel or be fan-folded.

Dimensionally, the carrier sheet should be of sufficient width to allow for the lateral or transverse mounting of at least one length of a pre-cut plastic spiral coil assembly and should preferably contain a plurality of such plastic spiral coil assemblies arranged in rows. In a continuous carrier sheet the coils would be mounted in rows along substantially the entire length of the strip. The carrier strip may also be perforated along each long edge with cutouts suitable for "tractor" feeding (e.g. as with continuous computer form printers.)

DRAWINGS

A preferred embodiment of the invention has been chosen for purposes of illustration and description and is shown in the accompanying drawings forming a part of the specification, wherein.

DESCRIPTION

Figure 1:
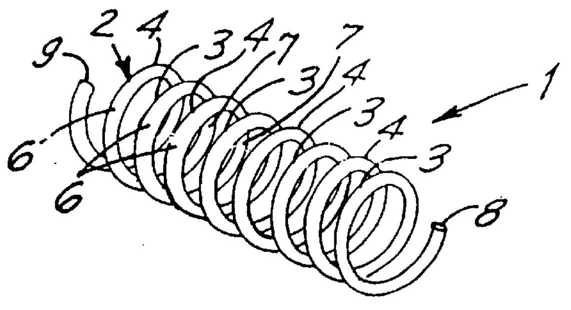
FIG. 1 is a diagrammatic perspective view of a plastic spiral coil assembly which is to be used with the present invention.

Referring to the drawings and more particularly to FIG. 1, the plastic spiral coil assembly 1 is adapted to bind a plurality of pages for books, etc. (not shown) together by affixing the pages to the coils 3 and 4 of the spiral plastic coil assembly 1 to keep them in place, as is well-known in the art.

The plastic spiral coil assembly 1 used in connection with the present invention comprises a continuous length of plastic filament 2 which is coiled upon itself (by any well known or suitable method or mechanism) to form a plurality of adjacent coils 3 and 4. The coils 3 and 4 preferably have substantially the same amplitude, are substantially equally spaced from each other, are substantially equally pitched with respect to each other and its filament 2 is substantially circular in cross section. Each coil 3 and 4 has front and rear portions 6 and 7, respectively, which have been arbitrarily so designated herein. Each plastic spiral coil assembly 1 is of a predetermined length and terminates in ends 8 and 9.

Figure 2:
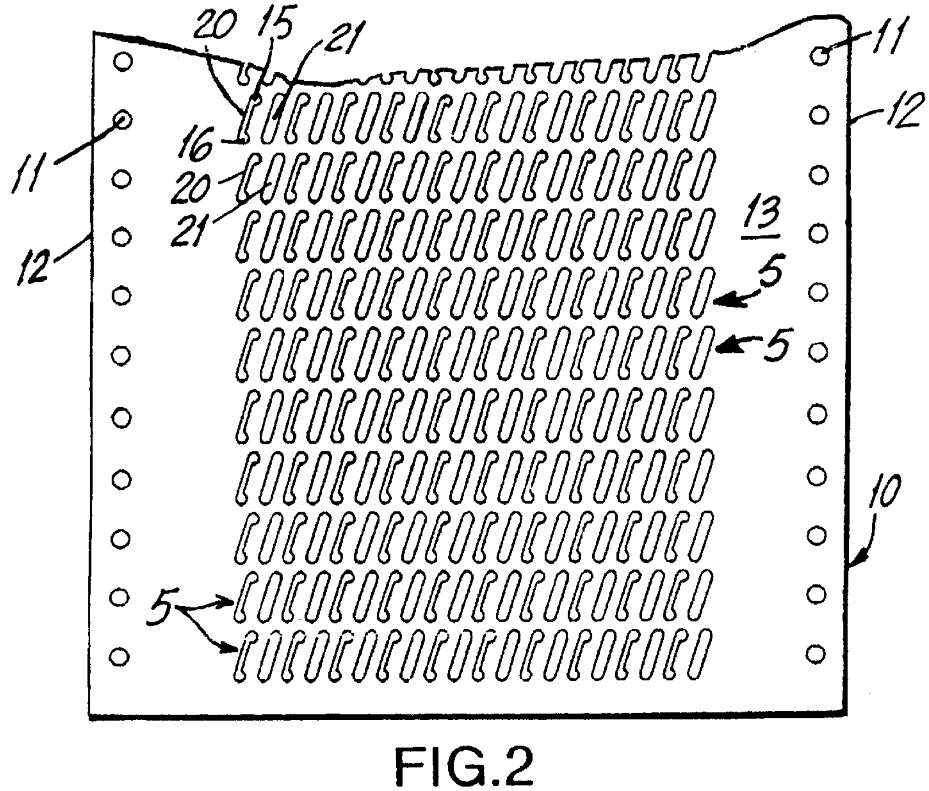
FIG. 2 is a plan view of a carrier sheet made in accordance with the present invention.
Figure 3:
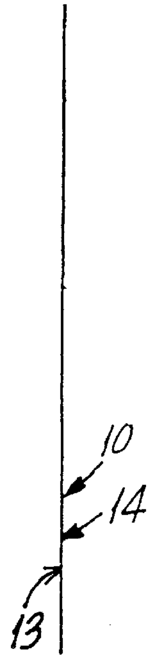
FIG. 3 is a side view of the carrier sheet shown in FIG. 2.
Figure 4:
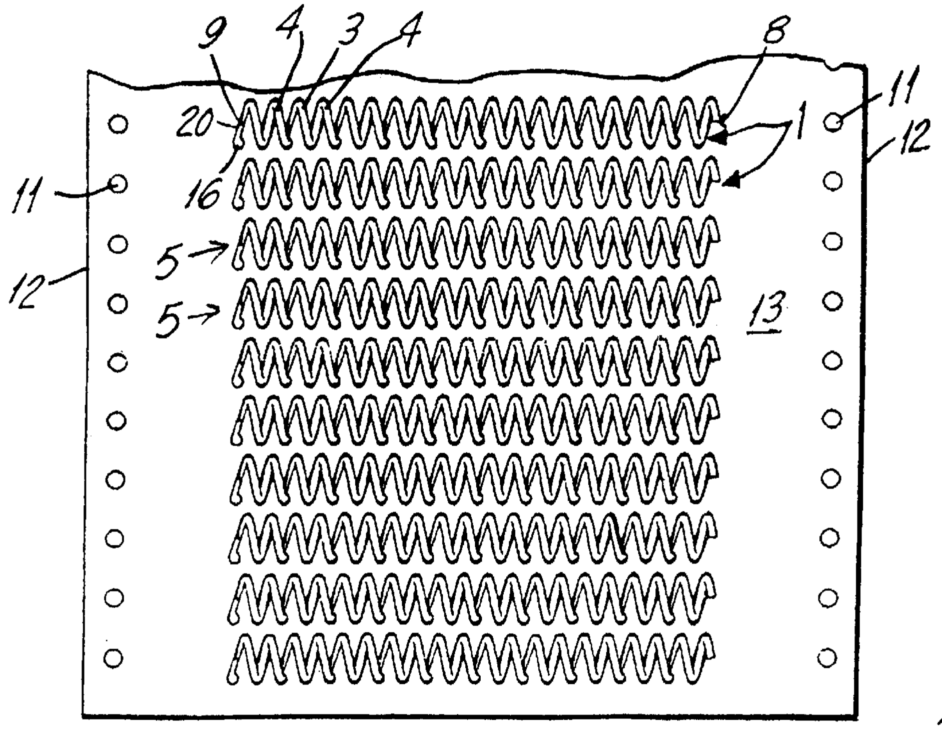
FIG. 4 is a plan view of the carrier sheet with a plurality of plastic spiral coil assemblies mounted thereon.
Figure 5:
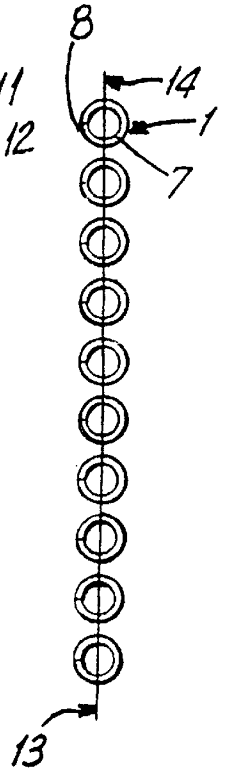
FIG. 5 is a side view of the sheet shown in FIG. 4.

Referring to the embodiment shown in FIGS. 2 to 7, the carrier sheet 10 made in accordance with the present invention is shown in FIG. 2 and preferably comprises a continuous sheet or strip preferably made of paper which is of sufficient width to allow mounting of at least one length of a pre-cut plastic spiral coil assembly 1 transversely thereon. However, it will be understood that the carrier sheet 10 may be of sufficient width to allow more than a single plastic spiral coil 1 to be mounted transversely thereon. The carrier sheet 10 may have the usual feed perforations 11 along each edge 12 and has front and rear faces 13 and 14, respectively. While the carrier sheet 10 is shown as being a long continuous strip or sheet, it is within the scope of the present invention for the carrier sheet 10 be short.

Figure 6:
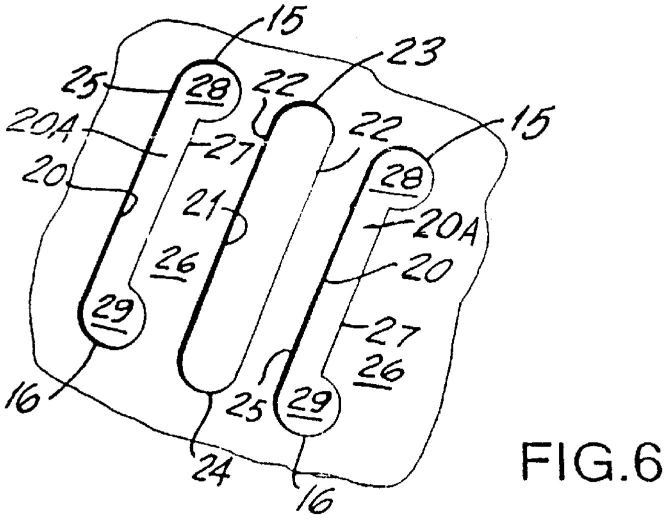
FIG. 6 is an enlarged portion of the carrier sheet shown in FIG. 3.
Figure 7:
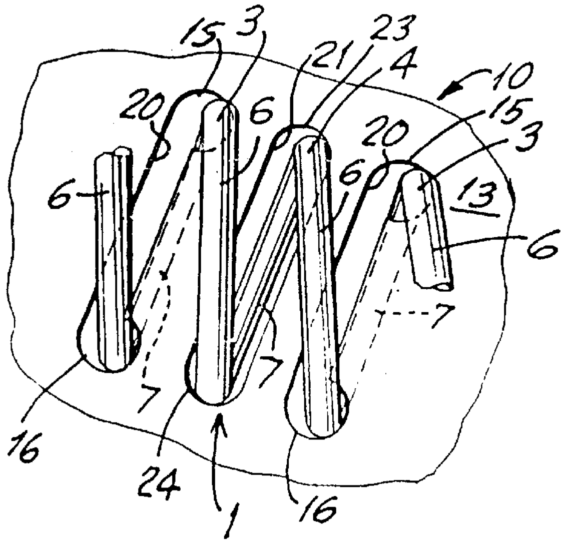
FIG. 7 is an enlarged portion of the carrier sheet shown in FIG. 4.

The carrier sheet 10 has a plurality of cut-outs 20 and 21 formed transversely across the face of the sheet to form a row 5 of transverse cut-outs 20 and 21. The cut-outs 20 and 21 are adapted to have substantially the same spacing and pitch as the spacing and pitch of the coils 3–4 on the plastic spiral coil assembly 1 which is to be mounted thereon. A plurality of rows 5 of such transverse cut-outs 20–21 are preferably provided in the carrier sheet 10 as shown in FIG. 2. As shown in FIG. 6, pre-selected receiving cut-outs 21 in a particular row 5 are shown in the drawing as alternating with holding cut-outs 20.

The receiving cut-outs 21 are provided with top edge 23 and bottom edge 24 and with a pair of spaced parallel side edges 22 which connect the bottom and top edges 23–24 together.

The holding cut-outs 20 have top and bottom edges 15–16, respectively, and a side edge 25 connecting the top and bottom edges 15–16 together. Opposite said side edge 25 there is provided an elongated extension 26 forming a side edge 27 which is parallel to the side edge 25 and which stops short of top edge 15 and bottom edge 16 to form holding openings or notches 28 and 29 each of which is adapted to receive a portion of coil 3 of the plastic spiral coil assembly 1. The edge 27 of the extension 26 connects the edges of the holding notches 28 and 29 together so that each holding cut-out 20 comprises top edge 15, bottom edge 16, side edge 25 and side edge 27 with top and bottom holding notches 28–29. It will be seen that the space 20A in the holding cut-outs 20 between the edges 25 and 27 is narrower than the space between the edges 22 of the cut-outs 21 and narrower than the diameter of filament 2. Preferably, each of the holding notches 28–29 is circular (although they may have other configurations) with a closed portion of about 270 degrees and an open portion of about 90 degrees. The 90 degree open portion of the holding notches 28–29 merges into and communicates with the intermediate space or openings 20A formed between side edges 25 and 27. Preferably the diameter of the holding notches 28–29 is about the same as or slightly greater than the diameter of the filament 2 of the portion 2 spiral coil assembly 1 which is to be inserted therein.

The coils 3–4 are pushed through and lie in cut-outs 20–21, respectively, and the plastic spiral coil assembly 1 is held in place on the carrier sheet 10 by its coils 3–4 resting in openings 20 and 21, respectively. Alternate coils 3 of the plastic spiral coil assembly 1 will extend through and lie in alternate holding cut-outs 20 and alternate coils 4 will extend through and lie in cut-out 21. In each case, the rear portion 7 of the coils 3–4 extends through the carrier sheet 10 to a position beneath the rear face 14 of the carrier sheet 10 with the front portion 6 of the coils remaining above the front face 13 of the carrier sheet 10. The coils 3–4 abut against the top and bottom edges 15–16 and 23–24, respectively, of the cuts 20–21. Alternate coils 4 will lie in cut-outs 21. However, alternate coils 3 will lie in and be held in place by the holding notches 28–29 in holding cut-outs 20. The filament 2 of the coil 3 will substantially fill the holding notches 28–29 and be held in place by the fact that the holding notches 28–29 are closed for about 270 degrees. The entire plastic spiral coil assembly 1 is held in place on the carrier sheet 10 in this manner.

It will be understood that the holding cut-outs 20 may occur at different intervals (rather than alternately) along a transverse row 5 of cut-outs 20–21 although they should preferably be close enough to each other to prevent the plastic spiral coil assembly 1 from buckling or bowing away from the face 13 of carrier sheet 10. It will also be understood that an entire row 5 may be comprised of holding cut-outs 20 only, if desired.

Figure 9:
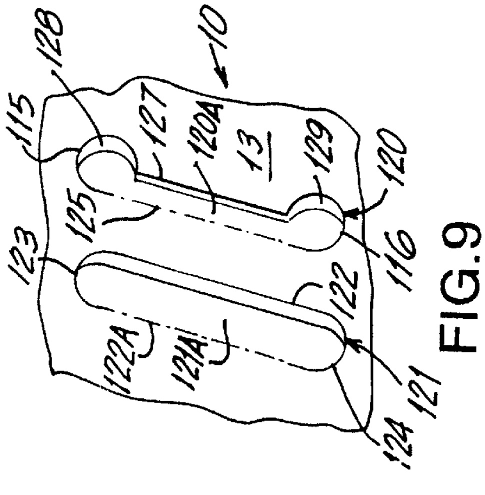
FIG. 9 is a view similar to FIG. 8 and showing the cut-outs in the carrier sheet in their operative position.
Figure 8:
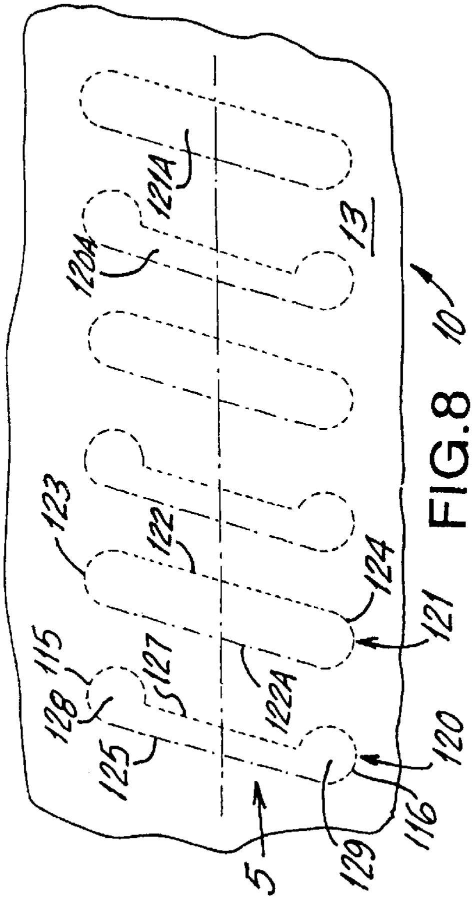
FIG. 8 is a plan view enlarged of a portion of a carrier sheet showing a modification of the present invention.

The embodiment shown in FIGS. 8 and 9 is similar to the embodiment shown in FIGS. 2 through 7. However, instead of the cut-outs 120–121 being full cut-outs, the cut-outs 120 and 121 in carrier sheet 10 are perforated for easy separation along some of the edges and for folding along an edge. In holding cut-outs 120, the edges 115–116 and 127 are perforated for easy separation while edge 125 is a fold line to act as a hinge. In the cut-outs 121 the edges 123, 124 and 122 are perforated for easy separation while edge 122A is a fold line acting as a hinge. Hence, when the perforations 115, 116 and 127 are broken, the paper 120A will fold down along hinge 125. This forms holding openings or holding notches 128 and 129 and an extension 126 which operate in the same manner as the holding notches 28 and 29 to hold the plastic spiral coil assembly 1 in place. When the perforation 122, 123 and 124 of cut-outs 121 are broken the paper 121A will fold down along the hinge 122A. Again, the holding notches 128–129 are preferably circular but may have other configurations.

Figure 10:
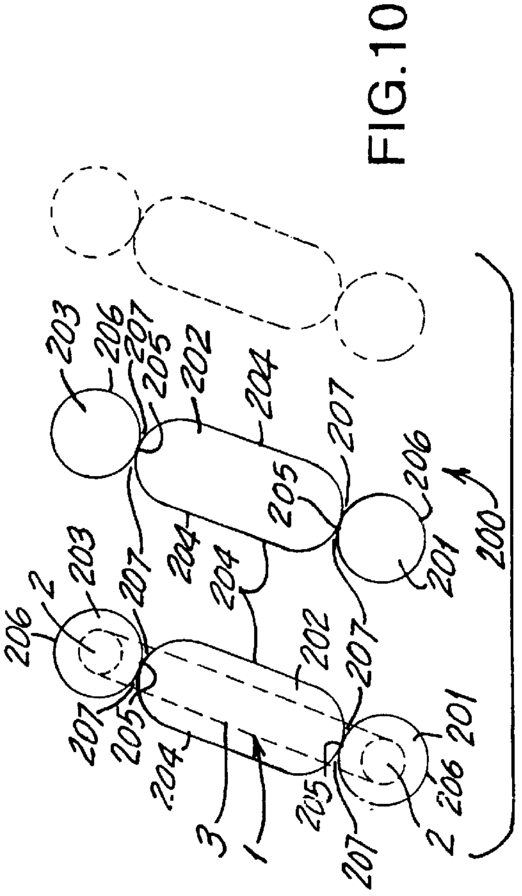
FIG. 10 is a diagrammatic plan view showing another embodiment of the present invention.
Figure 11:
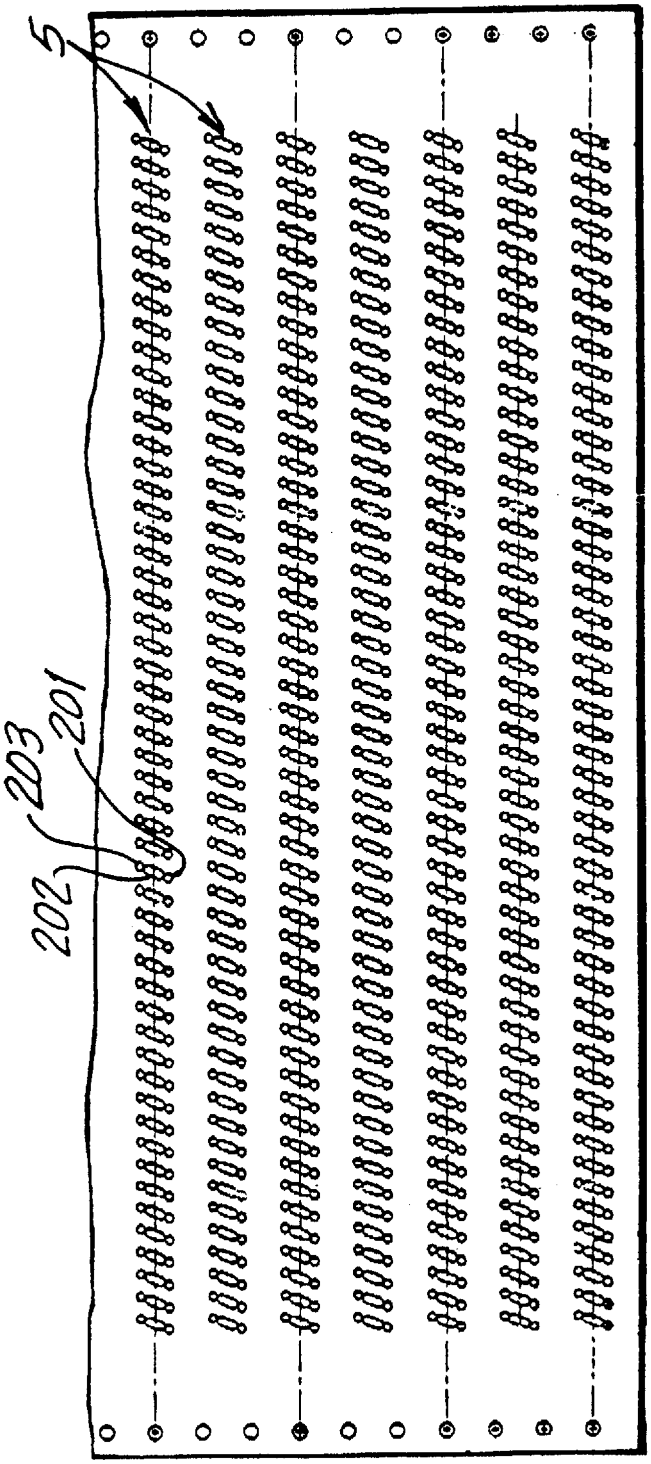
FIG. 11 is a plan view of a carrier sheet made in accordance with the embodiment shown FIG. 10.

FIGS. 10 and 11 illustrates another modification of the present invention. In this instance, the holding cut-outs 200 comprise a plurality of openings 201, 202 and 203 which are positioned along an axis having the same pitch and spacing as the pitch and spacing of the coils 3–4 in a plastic spiral coil assembly 1 which is to be mounted therein. The openings 201 to 203 are shown in the drawing as comprising an elongated central opening 202 having a pair of parallel side edges 204 and a pair of upper and lower curved end edges 205. The holding openings 201 and 203 are preferably circular (although they may have other configurations) with each having its center on the axis of the elongated central openings 202 and each having a circumferential edge 206 which is preferably tangent to the upper and lower end edges 205 of the central elongated opening 202. The diameter of the circular holding openings 201 and 203 is the same as or slightly greater than the thickness of the filament 2 of a plastic spiral coil assembly 1. Holding points 207 are formed by the proximity or tangency of the openings 201, 202 and 203 at the place where the edges 205 and 206 thereof meet. When the plastic spiral coil assembly 1 is to be mounted on the sheet 10, the coils 3 and 4 are pushed into the openings 201–203 of the holding cut-outs 200 with a portion of a coil positioned in holding openings 201 and 203 so that the holding points 207 surround the filament 2 and hold the plastic spiral coil assembly 1 in place.

It is possible that the holding openings 201 and 203 may not, (either by accident or by design), be exactly tangent to opening 202 and that some paper may be left between opening 202 and holding openings 201 and/or 203. However, this paper will break through when the plastic spiral coil assembly 1 is pushed through the openings 201 to 203 so that holding points 207 would be larger than those shown in the drawing. However, they would still be able to hold the plastic spiral coil assembly 2 in place. It is also possible that the holding openings 201 and 203 overlap the central opening 202 so that the holding points 207 would be smaller than the holding points 207 as shown in FIG. 10. While the rows 5 of cut-outs 200 on the carrier sheet 10 are shown as being comprised solely openings 201 to 203, it is possible that the openings 201 to 203 be at spaced intervals in row 5 interspersed with plain openings similar to the openings 21 or 121 in the embodiments shown in FIGS. 2 to 10.

In the embodiment shown in FIGS. 2 to 7, a plastic spiral coil assembly 1 is placed on each of the rows 5 of cut-outs 20–21. The adjacent coils 3 and 4 will be inserted into the adjacent cut-outs 20 and 21 respectively. The holding notches 15–16 will receive and hold alternate coils 3 in place. Hence, each plastic spiral coil assembly 1 is held in place and does not fall off the carrier sheet 10 and will not buckle or bow away from the front face 13 of the carrier sheet 10.

In the embodiment shown in FIGS. 8 and 9, each plastic spiral coil assembly 1 is would on the carrier sheet 10 in a manner similar to the embodiment shown in FIGS. 2 to 7. However, rather than the cut-outs 120–121 being full cut-outs, they are perforated for separation along all the edges with one side-edge 122A and 125 being a hinge or fold line. Hence, when the plastic spiral coil assembly 1 is inserted in the cut-outs 120–121, the perforations separate and the paper 120A–121A is folded down around the fold lines 125 and 122A, respectively and remains on the sheet 10.

In the embodiment shown in FIGS. 10 and 11, the plastic spiral coil assembly 1 is pushed through the holding openings 201 and 203 and the coils are held in place by the holding points 207 formed between the intermediate opening 202 and the holding openings 201 and 203.

Various well known mechanisms may be used for mounting the plastic spiral coil assembly 1 onto the carrier sheet 10 and they may even be mounted manually, if desired.

Figure 12:
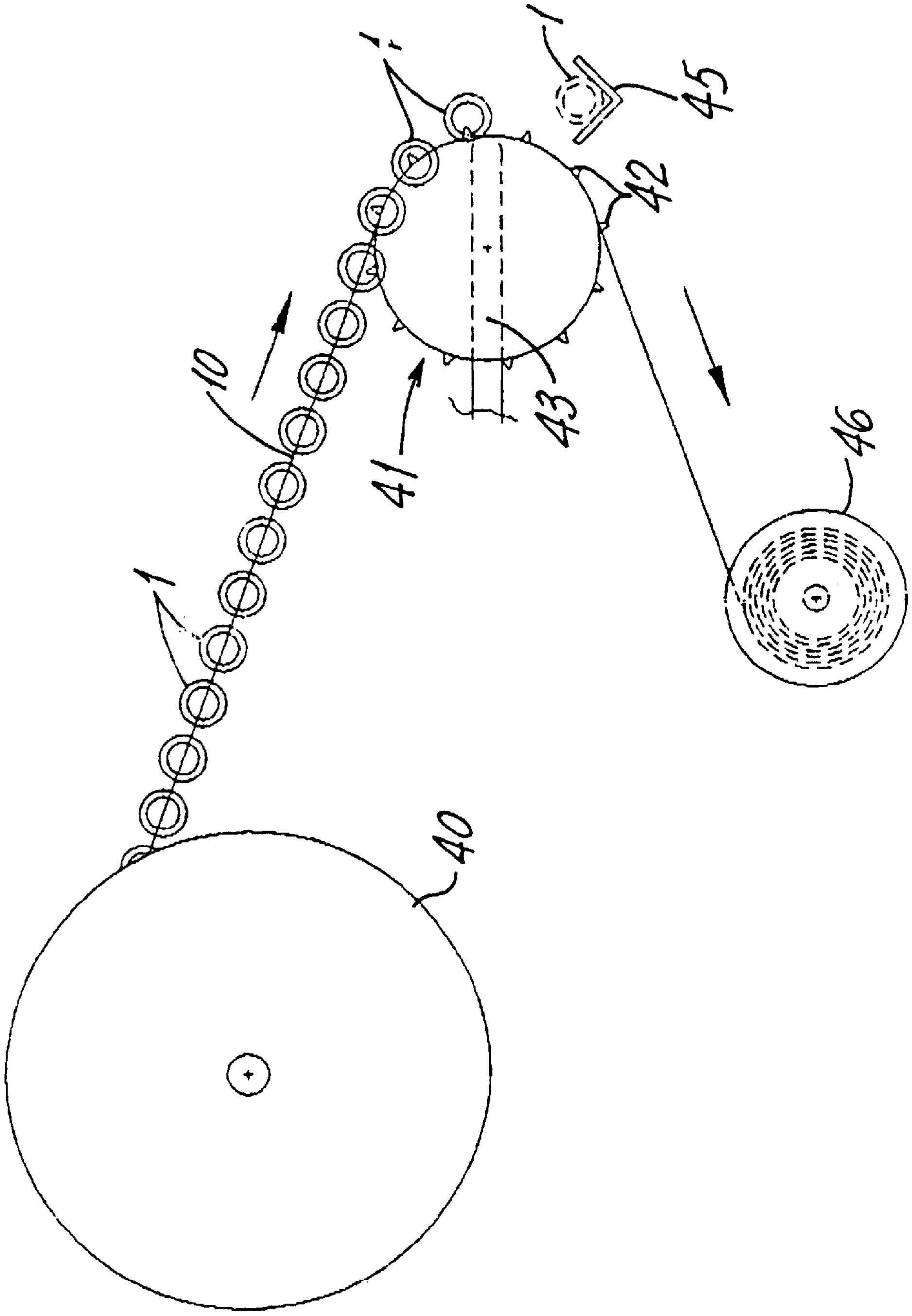
FIG. 12 is a diagrammatic plan view showing one manner of operating a binding system with the present invention.

One mechanism which may be used for automatically presenting each plastic spiral coil assembly 1 to a binding device (not shown) where the plastic spiral coil assembly 1 has pages attached to it to form a book or similar article is shown in FIG. 12. The carrier sheet 10 with a plurality of plastic spiral coil assemblies 1 mounted (loaded) thereon in a plurality of rows 5 may be wound on a reel 40. It will be understood that the loaded carrier sheet 10 may also be stored in a fan folded manner, if desired. The loaded carrier strip 10 is fed to a coil stripping mechanism 41. The coil stripping assembly 41 shown in the drawing has feeding fingers 42 which are adapted to be inserted into the feeding edge perforations 11 in order to move the loaded strip 10 along. A coil stripping mechanism 43 in the stripping wheel 41 is provided to push each plastic spiral coil assembly 1 out of the rows 5 of cut-outs. As each plastic spiral coil assembly 1 approaches the coil stripping mechanism 43, it will push each plastic spiral coil assembly 1 out of the carrier strip 10 and allow it to be deposited in a feeding device 45. In the drawing the feeding device is shown as a trough 45 (which may be v-shaped) which will align the coil 1 with a binding device (not shown) which will then apply the coil 1 to the pages to be bound. The empty carrier sheet 10 may then be wound up on a take-up reel 46 and can be discarded or reused if desired.

It will thus be seen that the present invention provides an improved system which allows for the continuous feeding of plastic spiral coils into a binding machine, which allows for an increase in binding speed and which allows for the automatic feeding of plastic spiral coils into a binding machine. The present invention also provides an improved plastic spiral coil system for binding books and the like which permits a greater number of books to be bound than presently attainable, which provides an improved system for feeding plastic spiral coils to a binding machine and improved means for storing plastic spiral coils until they are to be used. The present invention further provides improved holding means for holding plastic spiral coils which may be shipped, stored or displayed without disturbing the individual plastic spiral coils which are mounted thereon and which is simple and inexpensive to operate and maintain.

As many varied modifications of the subject matter of this invention will become apparent to those skilled in the art from the detailed description given hereinabove, it will be understood that the present invention is limited only as provided in the claims appended hereto.

The embodiments of the invention in which an exclusive property or privilege is claimed are defined as follows:

1. A system for holding a spiral coil binding assembly formed from a coiled filament and having a plurality of coils with a predetermined pitch comprising a carrier sheet, a row of cut-outs on said carrier sheet, at least some of said cut-outs in the carrier sheet being holding cut-outs, said holding cut-outs comprising spaced holding openings and an intermediate opening interposed between said spaced holding openings, each of said holding openings adapted to receive the filament of a spiral coil binding assembly in order to hold the spiral coil binding assembly in place on the carrier sheet and being large enough to receive the filament, said intermediate opening and the spaced holding openings are in cooperative juxtaposition in order to receive a coil of a spiral coil binding assembly, said intermediate opening having an axis, said spaced holding openings being arranged along the said axis, said axis being substantially the same pitch and spacing as the pitch and spacing of the coils in a spiral coil binding assembly.

2. A system as set forth in claim 1 wherein the said holding openings are substantially circular.

3. A system as set forth in claim 2, wherein the holding openings are in substantial tangency to the ends of the intermediate opening.

4. A system as set forth in claim 3 wherein holding points are formed on the carrier sheet adjacent the point of tangency between the intermediate opening and the holding openings.

5. A system as set forth on claim 4 wherein a plurality of rows of cut-outs are provided on said sheet.

6. A system as set forth in claim 2 wherein said intermediate opening and said holding openings are integral with each other.

7. A system as set forth in claim 6 wherein the holding openings are in the form of notches connected together by the intermediate opening.

8. A system as set forth in claim 7 wherein the holding openings are closed for about 270 degrees.

9. A system as set forth in claim 8 wherein receiving cut-outs are interspersed between said holding cut-outs.

10. A system as set forth in claim 9 wherein said receiving cut-outs and said holding cut-outs alternate with each other on a row.

11. A system as set forth in claim 10 wherein a plurality of rows of cut-outs are provided on said sheet.

12. A system as set forth in claim 10 wherein said holding cut-outs and said receiving cut-outs are formed by perforations on the sheet and wherein an edge of said cut-outs is a fold line.

13. A system as set forth in claim 12 wherein a plurality of rows of said cut-outs are provided on said sheet.

14. A system as set forth in claim 2 wherein said sheet comprises a pair of spaced side-edge and wherein said axis is at an acute angle to at least one of said edges.

15. A carrier sheet for a spiral coil binding assembly, a row of cut-outs on said carrier sheet, at least some of said cut-outs in the carrier sheet being holding cut-outs, said holding cut-outs comprising spaced holding openings and an intermediate opening interposed between said spaced holding openings, each of said holding openings adapted to receive the filament of a spiral coil binding assembly in order to hold the spiral coil binding assembly in place on the carrier sheet and being large enough to receive the filament, said intermediate opening and the spaced holding openings are in cooperative juxtaposition in order to receive a coil of a spiral coil binding assembly, said intermediate opening having an axes, said spaced holding openings being arranged along the said axis, said axis being substantially the same pitch and spacing as the pitch and spacing of the coils in a spiral coil binding assembly.

16. A sheet as set forth in claim 15 wherein the said holding openings are substantially circular.

17. A system as set forth in claim 16, wherein the holding openings are in substantial tangency to the ends of the intermediate opening.

18. A sheet as set forth in claim 17 wherein holding points are formed on the carrier sheet adjacent the point of tangency between the intermediate opening and the holding openings.

19. A sheet as set forth on claim 18 wherein a plurality of rows of cut-outs are provided on said sheet.

20. A sheet as set forth in claim 19 wherein said intermediate opening and said holding openings are integral with each other.

21. A sheet as set forth in claim 20 wherein the holding openings are in the form of notches connected together by the intermediate opening.

22. A system as set forth in claim 16 wherein said sheet comprises a pair of spaced side-edges and wherein said axis is at an acute angle to at least one of said side edges.

23. A system for supplying the spiral coil assemblies to a binding mechanism comprising a carrier sheet having a plurality of spiral coil assemblies mounted thereon, means for moving the carrier past the coil removing mechanism, means for stripping the coil assemblies from the carrier sheet, means for the depositing the coil assemblies onto a feeding mechanism and means for feeding the coils to a binding device.

24. A system as set forth in claim 23 wherein said stripping means is a stripping bar.

25. A system as set forth in claim 24 wherein said carrier is sheet is moved onto a wheel and wherein said wheel operatively cooperates with said stripping bar to strip bar to strip the coil assemblies from the carrier sheet.

26. A system as set forth in claim 25 wherein said wheel is a hollow wheel and wherein the carrier strip with the spiral coil assemblies therein is presented to the outer surface of said wheel.

27. A system as set forth in claim 26 wherein said stripping bar is mounted within the wheel and pushed the coil assemblies out of the carrier sheet.

28. A system as set forth in claim 27 wherein said carrier sheet is a continuous sheet and is being fed from a source.

29. A sheet as set forth in claim 28 wherein the carrier sheet without the spiral coil assemblies thereon is moved to a take up wheel.

* * * * *